United States Patent [19]

Gershenfeld

[11] Patent Number: 5,729,388
[45] Date of Patent: Mar. 17, 1998

[54] SYSTEM EMPLOYING DISSIPATIVE PSEUDORANDUM DYNAMICS FOR COMMUNICATIONS AND MEASUREMENT

[75] Inventor: Neil Gershenfeld, Somerville, Mass.

[73] Assignee: Massachusetts Institute of Technology, Cambridge, Mass.

[21] Appl. No.: 713,017

[22] Filed: Sep. 12, 1996

Related U.S. Application Data

[62] Division of Ser. No. 491,789, Jun. 19, 1995, Pat. No. 5,579,337.

[51] Int. Cl.$^6$ .................................................. H04B 10/04
[52] U.S. Cl. ........................ 359/637; 359/629; 359/187; 359/184
[58] Field of Search .................. 359/629, 637, 359/187, 184

[56] References Cited

U.S. PATENT DOCUMENTS

| | | | |
|---|---|---|---|
| 3,705,758 | 12/1972 | Haskai | 359/239 |
| 4,632,518 | 12/1986 | Jensen | 359/239 |
| 5,291,555 | 3/1994 | Cuomo et al. | 380/6 |
| 5,293,425 | 3/1994 | Oppenheim et al. | 381/71 |
| 5,379,144 | 1/1995 | Shirasaki | 359/181 |
| 5,457,559 | 10/1995 | Saito et al. | 359/135 |

OTHER PUBLICATIONS

Simon et al., "Spread Spectrum Communications Handbook", Ch. 5, pp. 262–305, McGraw–Hill, 1994.

Cuomo et al., "Synchronization of Lorenz–Based Chaotic Circuits with Applications to Communications", IEEE Transactions on Circuits and Systems–II, vol. 40, No. 10, Oct. 1993.

Cuomo et al., "Circuit Implementation of Synchronized Chaos with Applications to Communications", The American Physical Society, vol. 71, No. 1, Jul. 1993.

Wu et al., "A Simple Way to Synchronize Chaotic Systems With Applications to Secure Communication Systems", International Journal of Bifurcation and Chaos, vol. 3, No. 6, 1993.

Kevin M. Cuomo, "Synthesizing Self-Synchronizing Chaotic Systems, International Journal of Bifurcation and Chaos", vol. 3, No. 5, 1993.

*Primary Examiner*—Georgia Y. Epps
*Assistant Examiner*—Thomas Robbins
*Attorney, Agent, or Firm*—Cesari and McKenna

[57] ABSTRACT

An optical communication and/or measurement system includes a transmitter that modulates a pseudo-random noise signal with a message signal to produce a wideband signal for transmission. A receiver, which demodulates the wideband signal to recover the message signal, includes an "analog" feedback shift register ("AFSR") that reproduces the noise signal based on samples of the received signal. The AFSR is a generalization of a linear feedback shift register ("LFSR"). The AFSR is characterized by a function that agrees with the function that characterizes the LFSR, at the points at which that function is defined. The AFSR includes beam splitters that are spaced in accordance with the associated pseudorandom code. The AFSR's function has stable fixed points at integer values and unstable fixed points at half-integer values and, the stable fixed points act as attractors. The AFSR thus produces a sequence that relaxes to the nearest integer-valued sequence.

As long as the samples of received signal that are fed to the AFSR fall within the basins of attraction that surround the stable values, the AFSR can accurately determine the expected next state of the shift register. While this can be done explicitly, the AFSR merges the symbol parsing, acquisition, tracking and update rules into a simple governing equation. The AFSR will thus entrain and produce an optical binary-valued pseudo-random noise signal.

3 Claims, 6 Drawing Sheets

SYSTEM EMPLOYING DISSIPATIVE PSEUDORANDUM DYNAMICS FOR COMMUNICATIONS AND MEASUREMENT

This application is a divisional application of U.S. patent application Ser. No. 08/491,789 filed Jun. 19, 1995 now U.S. Pat. No. 5,579,337.

FIELD OF THE INVENTION

The invention relates generally to communication and/or measurement systems and, more particularly, to systems that use spread spectrum modulation to convert relatively narrow-band information, or message, signals to wide-band signals for transmission.

BACKGROUND OF THE INVENTION

Communication and measurement systems often use spread spectrum modulation techniques to modify message signals for transmission in order to lower the probability of interception, reduce the peak power of the transmitted signals, allow greater channel sharing and/or improve interference rejection. Further, such systems may also use spread spectrum techniques to produce high resolution timing or ranging information, such as, for example, in global positioning systems. Spread spectrum modulation involves conversion of a relatively narrow-band message signal into a wide-band signal by multiplying it with, for example, a "pseudo-random" noise signal. In one arrangement, such as the direct sequence spread spectrum system described herein, this involves amplitude modulation of the noise by the message.

Linear feedback shift registers (LFSR's) are typically used to produce the pseudo-random noise. An LFSR consists of N stages connected together to pass their contents forward through the register, with certain stages tapped, or connected, into a feedback path. The feedback path combines the contents of the tapped stages and feeds the combination back to one or more of the stages, to update the register.

The LFSR produces a sequence of symbols, for example, binary symbols or bits, that is periodic but appears random in any portion of the sequence that is shorter than one period. A period is defined as the longest sequence of symbols produced by the LFSR before the sequence repeats. When this pseudo-random series of symbols is modulated by the message, the result is a wide-band signal with a flat power spectrum over one period of the pseudo-random signal.

The period of the pseudo-random signal is determined by the number of stages in the shift register and by the feedback between the stages. An LFSR with "N" stages produces a signal with a period of at most $2^N-1$ bits. If the feedback of the LFSR is set up in accordance with an irreducible polynomial over GF(2), also referred to as a maximum length polynomial, the period of the LFSR is equal to this maximum value, $2^N-1$. The period can thus be made as long as desired by (i) including in the register a sufficient number of stages and (ii) combining the stages in accordance with an associated maximum length polynomial.

The pseudo-random noise is produced by first initializing the LFSR, that is, setting each of the stages of the LFSR to a predetermined state, and then shifting the LFSR to produce as the output of the last stage of the register a sequence of bits. These bits are used to produce the pseudo-random noise signal, which may, for example, have signal values of −1 and +1 for corresponding binary values of 0 and 1. This signal is then modulated by the message signal to produce a signal for transmission.

A receiver demodulates, or despreads, a received version of the transmitted signal by reversing the modulation process, i.e., combining the received signal with a locally generated replica of the noise signal to reconstruct the desired message. To reproduce the noise signal, the receiver includes an LFSR that is identical to the one in the transmitter. The LFSR in the receiver must be in the same state as the one in transmitter, and it must also be operated in synchronism with the received signal, to produce the desired message. The receiver must thus determine both the state of the LFSR and a clock phase from the received signal. To do this the receiver performs cumbersome search and acquisition operations. Once the LFSR is operating in synchronism with the received signal, the receiver must perform operations that accurately track the received signal, so that the LFSR continues to operate in synchronism with the signal.

While the foregoing operations are usually applied to messages in digital, i.e., binary form, they can also be applied to analog or continuous-valued bounded messages, for example, messages whose instantaneous values lie anywhere in the range −1 to +1.

To ensure that the receiver synchronizes to and remains in synchronism with the received signal, some prior known systems use chaotic modulation signals. Synchronization, or entrainment, is ensured in a chaotic system that is non-linear, dissipative and in which the transmitter and the receiver are coupled such that their joint Lyapunov exponent is negative.

In such a communication system the transmitter generates a chaotic noise signal and modulates this signal by the message signal to produce a chaotic signal for transmission. A receiver in the chaotic system manipulates the transmitted signal, by applying that signal to its own chaotic noise signal generator, thereby synchronizing this generator to the one in the transmitter and recovering the message. An example of such a system is discussed in U.S. Pat. No. 5,291,555 to Cuomo et al.

The noise signal produced by a chaotic system is randomly driven, because of the exponential amplification of small fluctuations. The system is not an ideal noise source, however. There can be linear correlations in the signal that lead to undesirable peaks in the power spectrum that must be filtered for optimum use of available bandwidth. Further, even after filtering to flatten the power spectrum there remain non-linear correlations, which can interfere with subsequent coders or make the system more susceptible to unintended reception.

The filters required to flatten these peaks are at best complex, and may not be realistically or economically feasible. Also, the filters required in the receiver to restore the peaks are also complex and may be infeasible. If so, the transmitter may have to transmit with reduced power, which may adversely affect the reception of the signal.

Moreover, if the receiver in the chaotic system is to synchronize to the transmitted signal within a reasonable time, the message signal cannot be too large when compared to the chaotic carrier signal. If the message signal is too small, however, the transmitted signal is comprised mainly of the chaotic carrier and bandwidth is wasted.

As in any communication system, there is a trade-off between time to synchronize, or lock, to a received signal and the robustness of the system, that is, the accuracy with which the system locks to the signal and remains locked thereafter. Known chaotic systems cannot be readily altered to change in a predictable way their attractor dimensions, i.e., the usable numbers of degrees of freedom. These systems thus cannot readily alter the trade-off between time to lock and robustness.

SUMMARY OF THE INVENTION

The invention is a system that modulates a pseudo-random noise with an analog message signal and includes, in a receiver that demodulates the modulated signal, an "analog" generalization of a linear feedback shift register. The analog feedback shift register (AFSR), which is both non-linear and dissipative, uses directly samples of the received signal to synchronize to that signal. The AFSR is thus coupled to the transmitter through the received signal. The system is non-chaotic and uses non-correlated (i.e., "ideal") pseudo-random noise to modulate a message. Synchronization of the transmitter and receiver in this non-linear and dissipative system is possible because of the coupling.

In general, the AFSR is characterized by a function A(x) that is a generalization of the function that adds (modulo-two) the contents of various stages of an analogous linear feedback shift register (LFSR). The map of $x_{n+1}=A(x_n)$ has stable (attracting) fixed points at integer values and unstable (repelling) fixed points at half-integer values. Consequently, for real-valued initial conditions, the sequence produced from the function A(x) relaxes on to the "nearest" binary-valued maximal sequence of 1s and 0s of the corresponding LFSR. This is discussed in more detail in Section B below.

The AFSR in the receiver uses a function $A_r(x)$ that is derived from the function that governs the operation of the associated LFSR, that is, the register used in the transmitter to modify the message signal. The AFSR's characterizing equation thus has stable limit cycles identical to the binary values, i.e., at 1 and 0. These limit cycles are "attractors" and the AFSR drives any values that are within "basins of attraction" associated with these attractors to the stable values. The AFSR thus produces an essentially binary-valued noise signal from an input signal consisting of samples of an analog received signal. This eliminates quantitization errors associated with assigning binary values to the received signal during demodulation, as is required with prior known systems that use LFSRs in both the transmitter and the receiver.

In an exemplary embodiment, the update expression for an N-stage AFSR is:

$$y_n = 1/2 \left[ 1 - \cos\left( \pi \sum_{i=1}^{N} \alpha_i y_{n-i} \right) \right]$$

where the $\alpha_i$'s are the coefficients of the maximum length polynomial governing the operation of the associated LFSR, $y_{n-i}$ is the state of the $(n-i)^{th}$ stage of the register, and $y_n$ is the feedback signal.

The AFSR also includes coupling circuitry, which combines the received signal with the feedback signal $y_n$, to produce an update signal, $y'_n$, for the first stage of the register. This coupling circuitry multiplies a measured sample $S_n$ of the received signal, or, in an alternative embodiment, a value that represents the sign of the signal sample, by a selected coupling factor, $\epsilon$, which is between 0 and 1. It then adds the product, for example, $\epsilon S_n$, to the product $(1-\epsilon)y_n$ and applies the sum $y'_n$ to the first stage of the AFSR. The selection of a value for $\epsilon$ determines the degree of coupling between the transmitter and the receiver, which, as discussed in more detail below, determines how quickly synchronization is achieved and how immune the register is to a corrupted received signal. The operation of the coupling circuitry is also discussed in more detail below.

In an alternative embodiment of the system, the coupling circuitry updates the AFSR, at selected times, with the feedback signal $y_n$, and at other times with the calculated value $y'_n$. In particular, it uses the feedback signal to update the AFSR when the amplitude of the received signal differs by more than a predetermined amount from the binary signal values. In this embodiment, it is convenient to use binary signal values of $-1$ and $+1$, rather than 0 and 1. The coupling circuitry uses the feedback signal to update the AFSR when $|(|S_n|-1)|>\delta$, where $\delta$ is chosen between 0 and 2-$\mu$ and $\mu$ is a modulation factor. When $|(|S_n|-1)|<\delta$, it uses the calculated values $y'_n=(1-\epsilon)y_n+\epsilon S_n$. As discussed in more detail below, the system applies to the AFSR signal samples $S_n$ that provide good estimates of the pseudorandom noise of the transmitter, and omits the samples that do not. Using this selection technique, the system can obtain and maintain synchronism with a received signal that includes a relatively large message signal.

AFSRs may be used in both the transmitter and the receiver, and in one configuration the two registers may have identical feedback paths. The AFSR in the receiver may thus couple a portion of the message into the signal that updates the register. This reduces demodulation errors in the receiver once lock has been achieved.

The current system combines the best features of the prior known chaotic and non-chaotic systems. The current system is a non-chaotic system that uses pseudo-random noise to spread the spectrum of the message signal, and thus, has the advantage of a flat power spectrum for the transmitted signal. The inventive system is also both non-linear and dissipative, which means that the receiver, coupled to the transmitter by the transmitted signal, can entrain, or synchronize, even when the transmitted signal contains a message that is relatively large when compared to the carrier. The signals transmitted using the current system thus include more information in the transmitted signal and waste less bandwidth than the signals transmitted by prior known chaotic systems. Further, the current system has the advantage of not requiring the assignment of binary, or digital, values to the received signal before recovery of the message, and thus, avoids synchronization problems that may be caused by quantitization errors.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

I first discuss in Section A a system that includes in a receiver an "analog" feedback shift register (AFSR). I then discuss in Section B the operative theory of the system. In Section C I discuss an alternative embodiment of the system, and in Section D I discuss an alternative implementation of the AFSR.

A. A First Embodiment of the System

Figure 1:
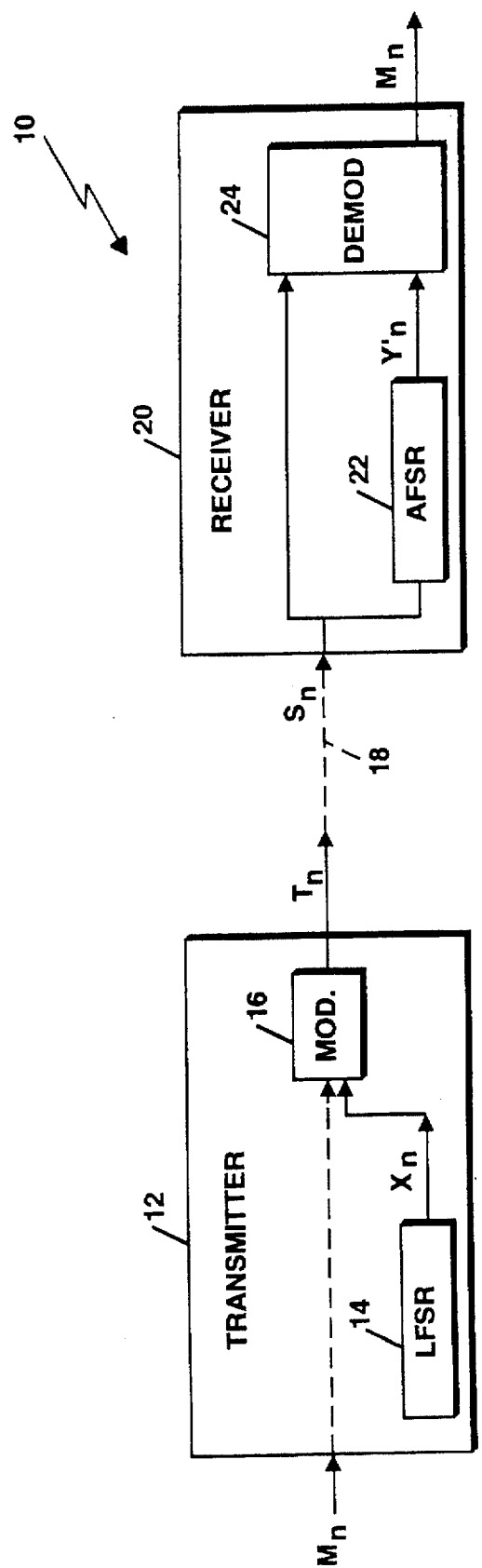
FIG. 1 is a functional block diagram of a signal transmission system constructed in accordance with the invention.

FIG. 1 depicts a signal transmission system 10 with a transmitter 12 that produces a wide-band signal, $t_n$, for transmission. The transmitter 12 includes a linear feedback shift register (LFSR) 14 that operates in a conventional manner to produce a pseudo-random noise signal $x_n$. A modulator 16 modulates the pseudo-random noise signal by an analog message signal, $m_n$, to produce $t_n = x_n(1+\mu m_n)$, where $\mu$ is the modulation factor. The transmitter 12 then transmits the modulated signal $t_n$ to a receiver 20 over a communications channel 18. The LFSR 14 is discussed in more detail with reference to FIG. 2 below.

The receiver 20 receives a version of the transmitted signal that may include channel noise. The receiver applies signals associated with samples, $S_n$, of the received signal to an "analog" feedback shift register (AFSR) 22, which, as discussed in more detail with reference to FIG. 2 below, uses non-chaotic, non-linear feedback to reproduce a signal, $y_n$, that is a synchronized version of the pseudo-random noise signal $x_n$. A demodulator 24 uses the reproduced noise signal to recover the message signal from the received signal by calculating:

$$m_n = \frac{S_n - y_n}{\mu y_n}$$

Figure 2:
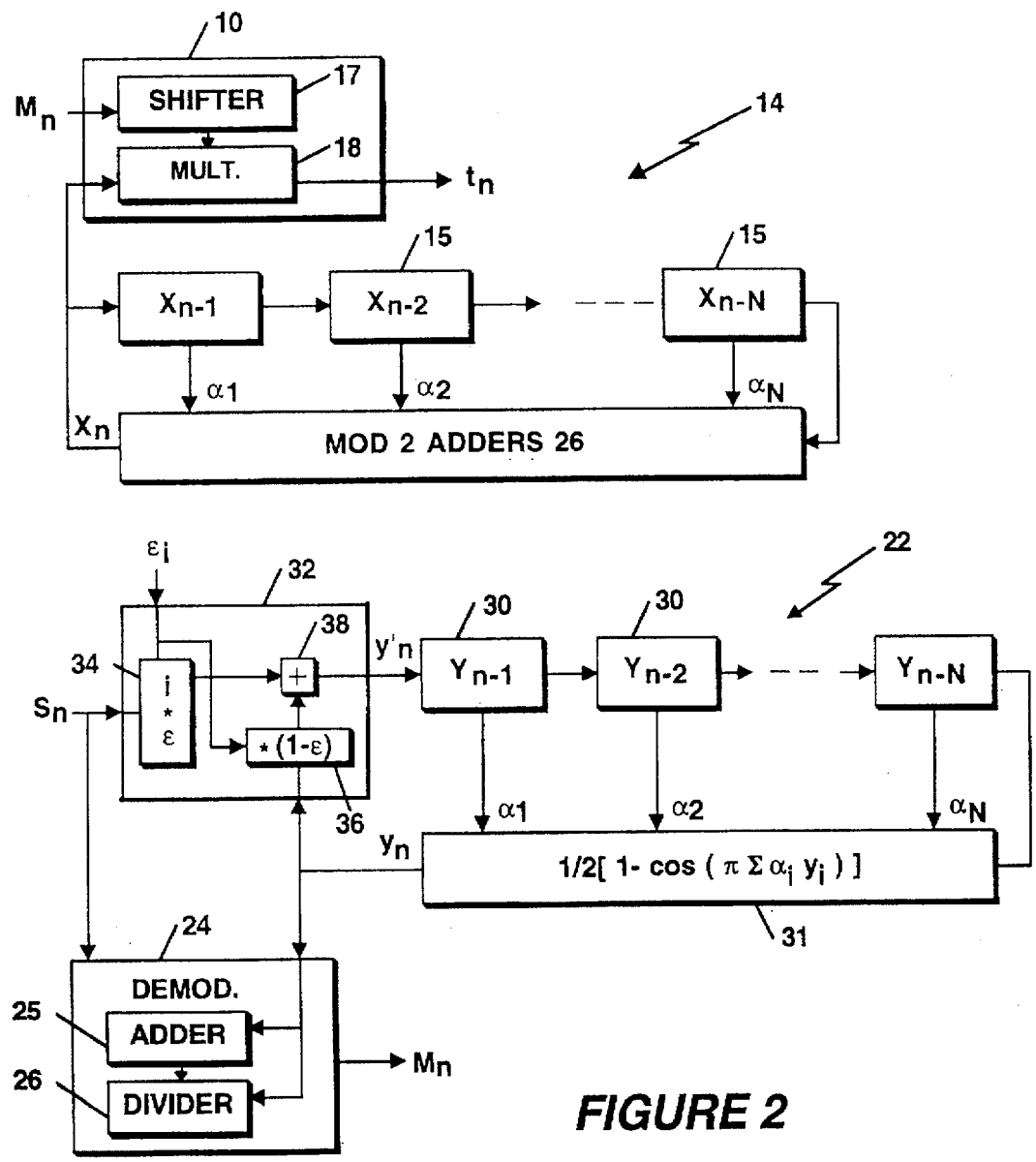
FIG. 2 is a functional block diagram that depicts in more detail a linear feedback shift register and an exemplary analog feedback shift register that are included in the system of FIG. 1.

Referring now to FIG. 2, LFSR 14 has N stages 15 and is organized in accordance with a maximum length polynomial over GF(2). It is characterized by the following update expression:

$$x_n = \sum_{i=1}^{N} \alpha_i x_{n-i} \quad (\mathrm{mod}\ 2)$$

where the $\alpha_i$'s are the coefficients of the maximum length polynomial and $x_{n-i}$ is the state of the $(n-i)^{th}$ stage of the LFSR 14. Modulo-two adders 26 combine the contents of the associated stages 15 in accordance with the update expression, to generate a feedback signal, $x_n$, that is applied to update the first stage 15 of the register. The feedback signal is also applied to the modulator 16, which multiplies it by a message signal that is limited by the modulation factor, that is, the signal $\mu m_n$. In the example, the modulator 16 includes a shifter 17 that shifts the message signal to produce a signal $1+\mu m_n$, and a multiplier 18 that multiplies the shifted signal by the LFSR feedback signal, $x_n$. The modulator thus produces for transmission the modulated signal $t_n = x_n(1+\mu m_n)$.

The update equation for the AFSR 22 is:

$$y_n = 1/2 \left[ 1 - \cos\left( \pi \sum_{i=1}^{N} \alpha_i y_{n-i} \right) \right],$$

where the $\alpha_i$'s are the coefficients of the maximum length polynomial that characterizes the LFSR 14, and $y_{n-i}$ is the state of the $(n-i)^{th}$ stage 30 of the AFSR. As discussed in more detail in Section B, this equation has stable limit cycles with period $2^N - 1$ at binary integer values. The stable limit cycles are "attractors", and the AFSR essentially drives any values that are within "basins of attraction" associated with these attractors to the stable, that is, the binary, limit cycle values.

The feedback path of the AFSR includes floating point processors 31, or their analog equivalent. These processors 31 combine the contents of the tapped stages 30 in accordance with the update expression. As discussed above, the AFSR uses directly the samples of the received signal—and does not require that these samples be translated to binary values.

The feedback signal $y_n$ produced by the feedback path is coupled to the first stage 30 through coupling circuit 32. The coupling circuit 32 updates the AFSR 22 with an update signal, $y'_n$, that is a combination of the feedback signal, $y_n$, and the received signal, $S_n$. A coupling factor, $\epsilon$, determines how much of the received signal, and in turn, how much of the feedback signal, are included in the update signal. The coupling factor is discussed in more detail below.

The coupling circuitry 32 includes floating point processors 34, 36 and 38 or their analog equivalents. Multiplier 34 multiplies samples of the received signal by the coupling factor $\epsilon$, multiplier 36 multiplies the feedback signal $y_n$ by $1-\epsilon$, and processor 38 then adds the products of the multipliers, to produce an update signal:

$$y'_n = \epsilon S_n + (1-\epsilon) y_n.$$

The feedback signal $y_n$ is also applied to the demodulator 24. The demodulator 24 includes a subtractor 25 that subtracts the feedback signal from the received signal, and a divider 26 that divides the sum by $\mu$ times the feedback signal, to recover the message signal from the received signal.

The receiver 20 recovers a clock phase from the received signal in a conventional manner, using, for example, a phased-locked loop (not shown) and monitoring transitions in the received signal. The receiver also determines that the AFSR 22 and the received signal are in synchronism in a conventional manner.

The coupling factor, $\epsilon$, is between 0 and 1. When it is closer to 1, more of the received signal is included in the update signal. This tends to allow the AFSR 22 to synchronize more rapidly to the received signal. If the coupling factor is too close to 1, however, corruption of the received signal may adversely affect synchronization.

When the coupling factor $\epsilon$ is closer to 0, more of the feedback signal and less of the received signal to be applied to the register. The register may thus take longer to synchronize. It can more easily handle a corrupted received signal, however, since less of the signal is used to update the register. There is thus a trade-off between the time it takes for the register to synchronize and the accuracy of the synchronization.

The coupling factor may be chosen initially closer to 1, for fast synchronization, and thereafter chosen close to 0 for enhanced handling of signal corruption.

Figure 3:
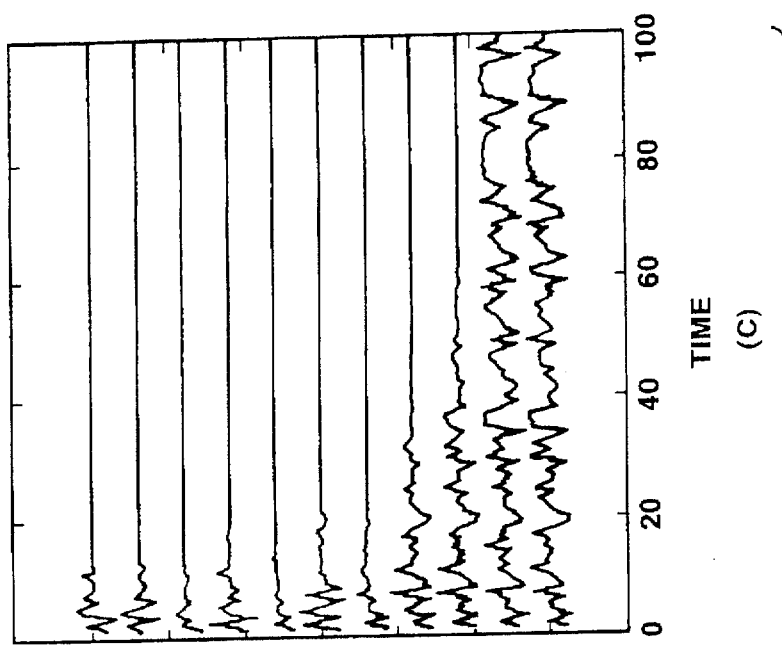
FIGS. 3A–3C are graphs depicting synchronization time, error and error variance as a function of a coupling factor associated with the analog feedback shift register of FIG. 2.
Figure 3:
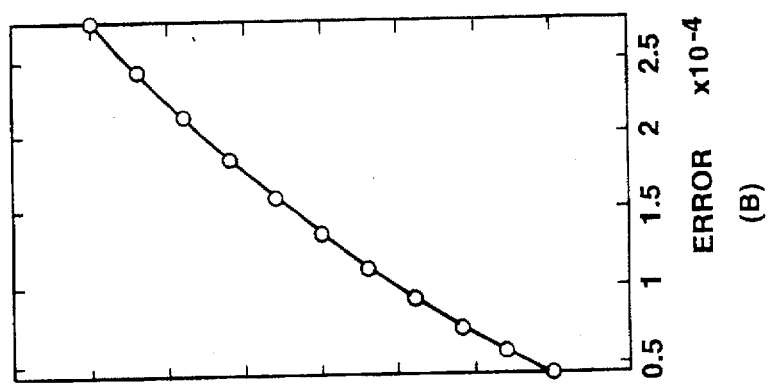
Figure 3:
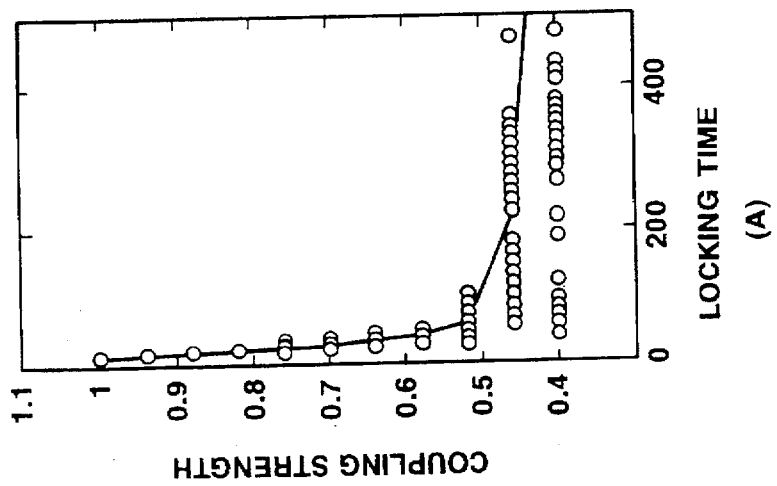

FIG. 3A depicts graphically the time it takes to synchronize the AFSR 22 as a function of the coupling factor $\epsilon$. FIG. 3B depicts synchronization error, i.e., $|x_n - y_n|$, as a function of $\epsilon$ and FIG. 3C depicts the standard deviation of the synchronization error as a function of $\epsilon$. As discussed above, the coupling circuitry may set the coupling factor $\epsilon$ initially close to 1 to achieve faster synchronization and thereafter (when, for example, the error rate in the recovered message is sufficiently low) it may set $\epsilon$ closer to 0.

The AFSR 22 may be used in any system that modulates a message signal with pseudo-random noise. It may thus be used in systems that simply modify the message signal by multiplying it by the pseudo-random noise or in systems that utilize more complex modulation schemes. Further, the AFSR 22 may be included in both the transmitter and the receiver. The AFSR in the transmitter will necessarily produce the same pseudo-random noise signal as the LFSR 14, since the AFSR in the transmitter is updated by its feedback signal, which is attracted to binary values.

In a system with AFSRs in both the transmitter and the receiver, the two registers, and thus, their feedback paths may be identical. The AFSR in the transmitter couples into the signal fed back to update the register a portion of the message, through coupling circuitry identical to that in the receiver. This reduces demodulation errors in the receiver, once the two AFSRs are operating in synchronism.

B. The Theory

The function $L(x)=x_n$ (mod 2) that characterizes the LFSR has for GF(2), i.e., binary systems, the following properties:

$L(x)=0$ if x is an even integer $L(x)=1$ if x is an odd integer.

The function is thus defined at integer values. The state space of the LFSR comprises the corners of an N-dimensional hypercube, which has one axis for each time delay, or stage, of the register. The sequence produced by the LFSR "visits" each corner of the hypercube once during a period.

Figure 4:
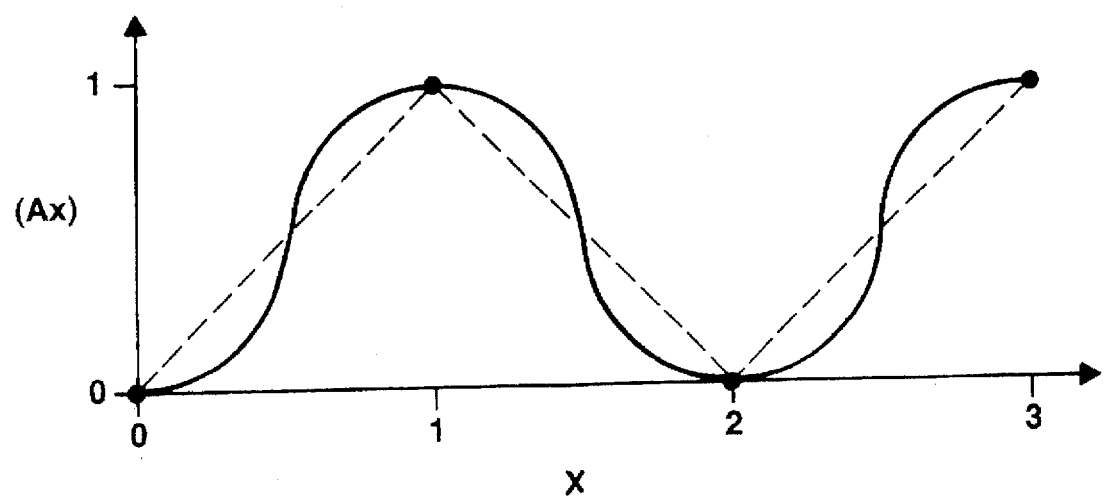
FIG. 4 is a diagram that illustrates the theory of the analog feedback shift register with the dotted line representing an addition modulo two function that characterizes a linear feedback shift register and the solid line representing the periodic function that characterizes the analog feedback shift register.

When the function $L(x)$ is generalized to $A(x)$ for the AFSR, the recursive relation $x_{n+1}=A(x_n)$ has stable fixed points at integer values and unstable fixed points at half-integer values. For real-valued x's, a sequence produced by $A(x)$ will relax onto the "nearest" binary-valued sequence since it is repelled by the unstable half-integer values and attracted to the stable integer values, as depicted in FIG. 4 in which the dotted line represents the addition modulo-two function $L(x)$ and the solid line represents the periodic AFSR function $A(x)$. The function $A(x)$ has the following properties:

$A(\text{even, odd}) = 0,1$ $\left| \frac{dA}{dx} \right|_{x_{integer}} < 1$

An example of such a function is the cosine function. It is not necessary that the function be symmetrical about the extrema, only that the slope has a magnitude of less than one about these points.

The AFSR has an attracting basin around the limit cycle of period $2^N$. In state space the corners of the associated N-dimensional hypercube become attractors, with basins of attraction around each of them dictated by the AFSR update expression. The AFSR, through its feedback path, drives sample values that are within the basins of attraction to the appropriate corners of the hybercube, and thus, to the stable integer values. As long as the samples of received signal that are fed to the AFSR fall within these basins of attraction, the AFSR can accurately determine the expected next state of the shift register. The AFSR will thus entrain and produce a binary-valued pseudo-random noise signal. While this can be done explicitly, the AFSR merges the sample parsing, acquisition, tracking and update rules into a simple governing equation.

C. A Second Embodiment of the System

Figure 6:
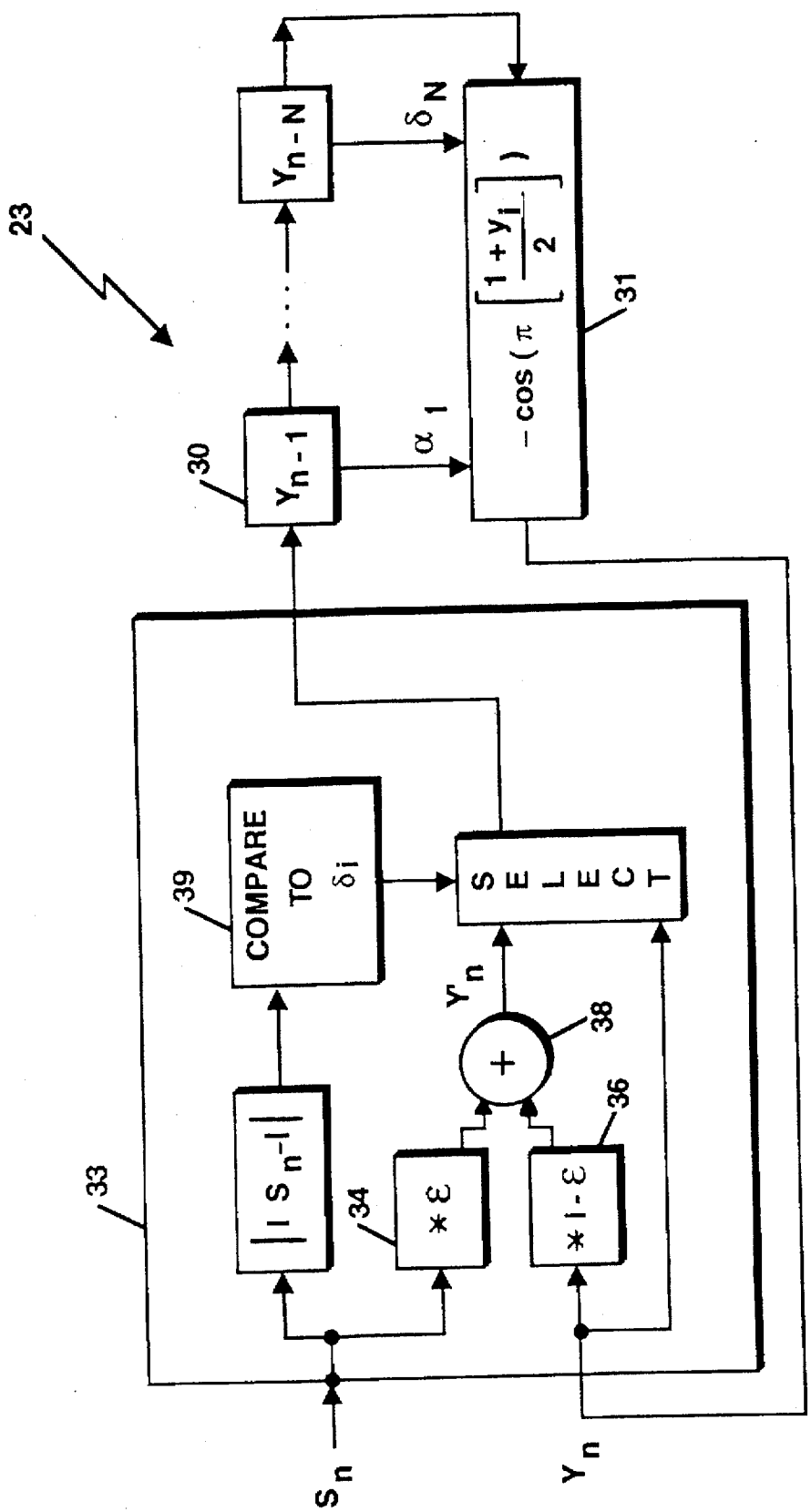
FIG. 6 is a functional block diagram of an analog feedback shift register constructed in accordance with a second embodiment.

Referring now to FIG. 6, the AFSR 23 includes a coupling circuit 33 that selectively couples to the first stage of the AFSR as an update signal (i) a signal that includes information associated with a received signal sample; or (ii) the feedback signal produced by the AFSR. In a system in which 0 and 1 binary values are represented by signal values −1 and 1, respectively, the coupling circuit includes a comparator 39 that compares the quantity $|(|S_n|-1)|$ with a predetermined maximum value $\delta$, to determine essentially if the received signal sample provides a good estimate of the transmitter pseudo-random signal produced by the LFSR or the AFSR in the transmitter. If the comparator 39 determines that the quantity does not exceed the predetermined value, it directs a selector 37 to apply to the first stage of the AFSR as an update signal $y'_n = \epsilon sgnS_n + (1-\epsilon)y_n$ where $sgnS_n$ is the sign of the signal sample.

If the comparator 39 determines that $|(|S_n|-1)|$ is greater than $\delta$, it directs the selector 37 to apply to the first stage of the AFSR the feedback signal $y_n$. The coupling circuitry thus refrains from including the corresponding received signal information in the update signal, and prevents a signal sample that provides a bad estimate of the transmitter's LFSR state [is outside the basin of attraction] from adversely influencing the state of the AFSR. The value of $\delta$ is chosen such that $0<\delta<2-\mu$.

In systems that use −1 and 1 as the binary signal values, the characterizing equation for the AFSR is $$x_n = -\cos\left( \pi \sum_i^N \alpha_i \left[ \frac{1+x_{n-i}}{2} \right] \right)$$

In this embodiment the use of the "selective" perturbations to the AFSR, i.e., the selective inclusion of information relating to the received signal and the update signal, is similar in spirit to the occasional feedback used in controlling conventional chaotic systems. See, for example, E. Ott et al., *Controlling Chaos*, Phys. Rev. Lett. Vol. 64, no. 11, p. 1196–99 (1990); R. Roy et al., *Dynamical Control of A Chaotic Laser: Experimental Stabilization of a Globally Coupled System* Phys. Rev. Lett. Vol. 68, no. 9, p. 1259–62 1259 (1992).

Figure 5:
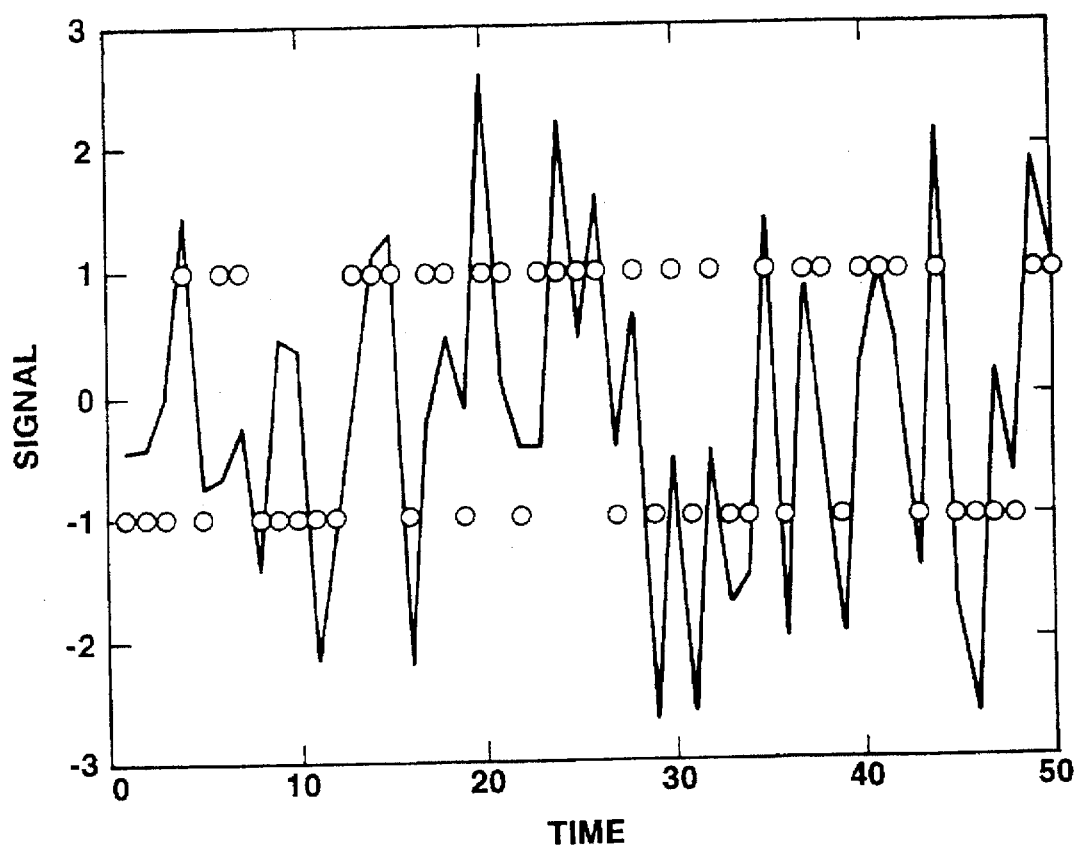
FIG. 5 is a graph depicting the operation of an illustrative system in acquiring a signal.

In the system described in Section A above there is an implicit restriction on the size of the modulation factor, $\mu$. If the message signal, $\mu m$, is relatively large when compared to the pseudo-random noise signal, samples of the transmitted signal $x_n(1+\mu m_n)$ may have values that differ significantly from the associated pseudo-random noise signal. These values may even have different signs, which may make ambiguous a next state of the AFSR, and thus, adversely affect synchronization. The value of $\mu$ also affects the time it takes to synchronize to the received signal. With a relatively large $\mu$, the system tends to require a longer time to lock to the received signal. Using the selective feedback, these adverse effects of using a larger $\mu$ can be minimized. As illustrated in FIG. 5, the current system locks relatively quickly to the signal, even with a $\mu=1.8$.

D. An AFSR Implemented as an Optical System

Figure 7:
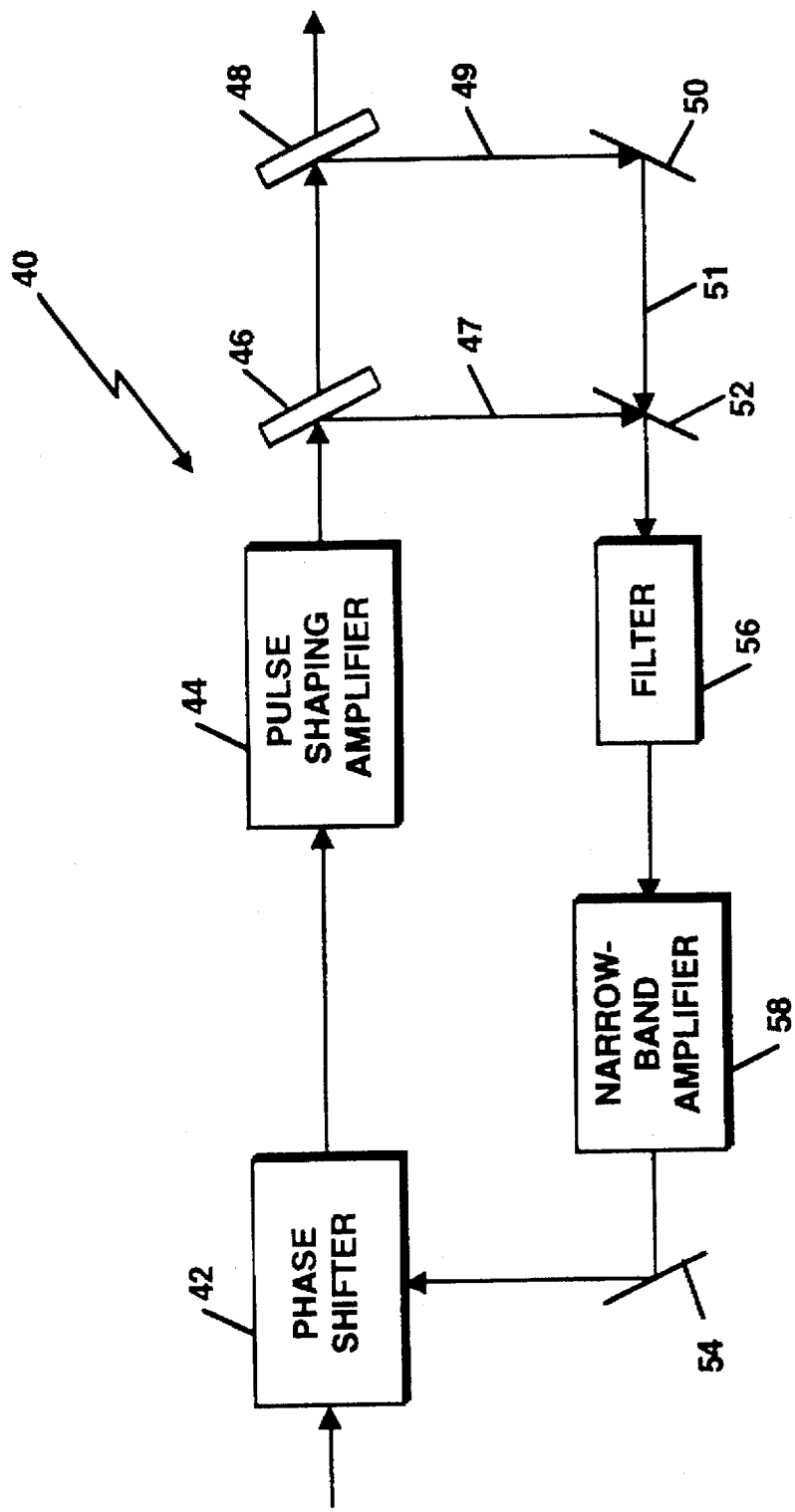
FIG. 7 is a functional block diagram of an analog feedback shift register implemented as an optical system.

FIG. 7 depicts a two-tap AFSR 40 that is implemented as an optical system. A pulse-shaping amplifier 44 produces pulses in response to an incoming signal that passes through a controllable phase shifter 42. The pulses produced by the amplifier 44 are successively applied to beam splitters 46 and 48 that are spaced in accordance with the associated pseudorandom code, and are thus spaced apart by an integral number of code chips. The beam splitters 46 and 48 are analogous to the delay taps of the AFSR of FIG. 1.

The light deflected by the beam splitter 46 along path 47 is coherently combined in a beam splitter 52 with the light deflected along path 49 by the beam splitter 48 and then reflected along path 51 by mirror 50. The resultant beam is steered by a mirror 54 to control the phase shifter 42. Specifically, the phase shifter 42, which is constructed of photo-refractive material, imparts a phase shift to the incoming signal that is proportional to the intensity of the light from the mirror 54. In the illustrative embodiment, the beam splitters and mirrors are spaced so that there is no appreciable delay relative to the chip length of the code. This ensures that the appropriate pulses are combined in accordance with the code, and thus, that when the system is synchronized to the incoming signal that the output signals passed by the beam splitter 48 are the pseudorandom code signals.

The beam splitters and mirrors are also positioned such that the path 47 from the beam splitter 46 to the beam splitter 52 and the combined paths 49 and 51 from the beam splitter 48 to the mirror 52 differ by an odd number of half-wavelengths, such that the signals along these paths are either in-phase or 180° out-of-phase. The signals thus cancel or add at beam splitter 52, which is analogous to the adders in the feedback path of the AFSR of FIG. 1. The combining of the deflected light and the use of that light to control the phase shifter 42 provides to the system the non-linearity that is analogous to the cosine function of the AFSR of FIG. 1. Accordingly, the system has attractors that drive the system to produce signals that operate the phase shifter 42 in two modes—one in which it shifts the phase of the incoming signal by 180° and one in which it shifts the phase of the incoming signal by 0°.

The signals from by beam splitter 52 are spread spectrum, or wide band. These signals interfere primarily over only a narrow band centered on the carrier frequency. A filter 56 filters from the wide band signal the frequencies that are outside of the narrow band over which the signals interfere. An amplifier 58 amplifies the filtered signals to produce signals in which the differences in signal intensities enable the phase shifter, when the AFSR is in synchronism with the incoming signal, to operate in the two modes of operation in which it shifts the phase of the signal by 180° or by 0°. The rate at which the transmitted signal is modulated should be selected such that the signal energy in the pass band of the filter 56 is sufficient to overcome any noise within that band.

While the system of FIG. 7 is discussed in terms of using optical signals, it may instead be implemented using any coherent radiation, such as microwaves, ultrasound, and so forth.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An analog feedback shift register including:
   A. a controllable phase shifter;
   B. a pulse-shaping amplifier for producing pulses in response to an incoming signal;
   C. a plurality of beam splitters spaced in accordance with an associated pseudorandom code, for deflecting light along predetermined paths;
   D. combining means for coherently combining the deflected light;
   E. means for steering the combined light to the phase shifter, which responds by shifting the phase on the incoming signal by an amount that is proportional to the intensity of the combined light.

2. The analog feedback shift register of claim 1 wherein the beam splitters are spaced apart by integral numbers of code chips.

3. The analog feedback shift register of claim 2 wherein the paths followed by the light deflected by the various beam splitters differ from one another by an odd number of half-wavelenghts.

* * * * *